Nov. 26, 1940.  R. C. BALL  2,222,699

COMPENSATING DEVICE FOR VALVE CONTROL

Filed Dec. 29, 1939  3 Sheets-Sheet 1

INVENTOR
RUSSELL C. BALL,
BY
ATTORNEY.

Nov. 26, 1940.   R. C. BALL   2,222,699
COMPENSATING DEVICE FOR VALVE CONTROL
Filed Dec. 29, 1939   3 Sheets-Sheet 2

INVENTOR.
RUSSELL C. BALL,
BY *Arthur Middleton*
ATTORNEY.

Nov. 26, 1940.     R. C. BALL     2,222,699
COMPENSATING DEVICE FOR VALVE CONTROL
Filed Dec. 29, 1939     3 Sheets-Sheet 3
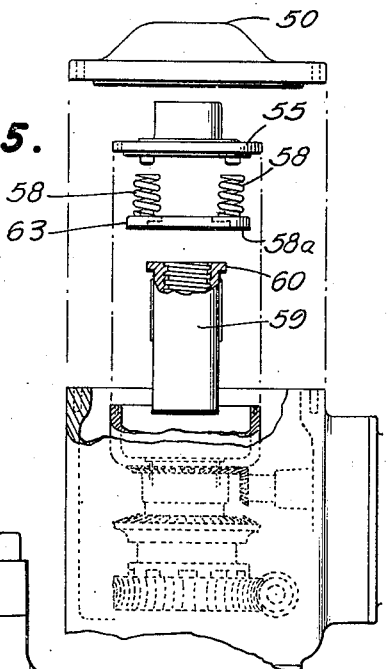
FIG. 5.
FIG. 3.
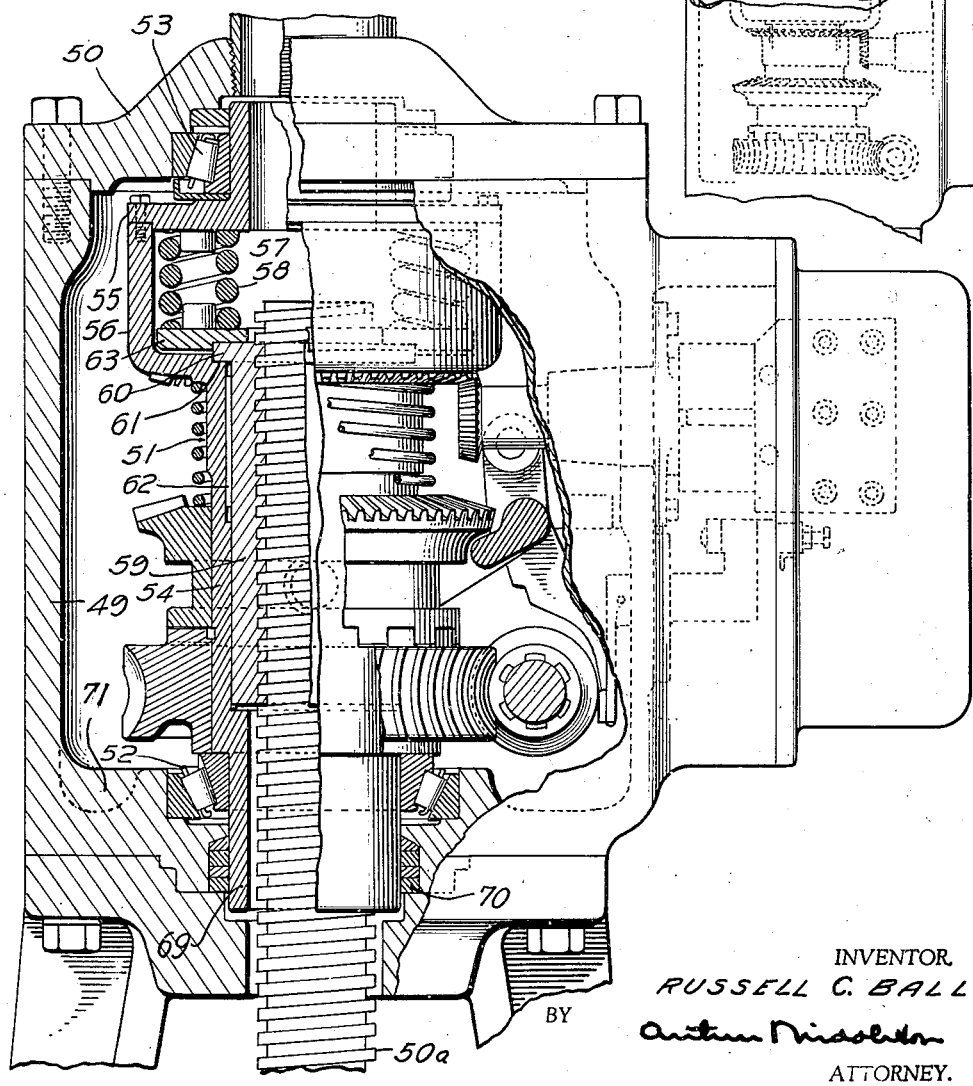
INVENTOR.
RUSSELL C. BALL,
BY
ATTORNEY.

Patented Nov. 26, 1940

2,222,699

UNITED STATES PATENT OFFICE 2,222,699

COMPENSATING DEVICE FOR VALVE CONTROL

Russell C. Ball, Philadelphia, Pa.

Application December 29, 1939, Serial No. 311,497

12 Claims. (Cl. 74—424.8)

This invention relates to power driven control apparatus such as a power controlled valve construction, and more particularly to improvements in compensating devices therefor as a safeguard against undue thrust reaction from an actuating stem having its longitudinal movement limited by a fixed abutment.

Excess thrust reaction from the stem may be experienced, for instance, because of thermal expansion of the stem, or else because of excess driving pressure imposed upon the stem after the fixed abutment has been reached.

For instance, in connection with power controlled valve constructions such compensating devices are known to comprise spring means surrounding the stem and effective between the driving nut for the stem and the base or housing of the drive mechanism, in that axial movement of the nut against spring pressure absorbs excess pressure from the stem.

For the sake of illustration, this invention may be considered to represent an improvement over a construction of the type disclosed in the United States Patent to Astrom No. 1,586,393, which Astrom patent has arranged in it a set of thrust absorbing springs which bodily rotate about the stem axis, together with the stem actuating drive members. The springs are confined in compression between a stem actuating nut which is axially shiftable, and a driven rotary thrust member which is axially non-shiftable, but in turn has direct driving connection with the spindle actuating nut.

Along with this Astrom patent, the construction according to the present invention may be said to belong to a type o~ class in which the compensating springs rotate with the associated spindle driving elements, and which shall hereinafter be termed as a rotary compensating device or assembly, as distinguished from differently organized compensating devices in which the compensating springs are stationary.

Consequently, it is among the objects of this invention to design a rotary compensating device which is compact and yet readily accessible with respect to the compensating springs therein, and which is structurally efficient in transmitting the driving forces to the driving nut of the stem by way of the housing of the drive mechanism and through the rotary compensating devices.

Another object is to design power driven mechanism of this type for actuating a stem in which the driving nut for the stem is conveniently removable substantially without disturbance of the driving elements associated therewith.

Another object is to produce simple and efficient mechanism to absorb thrust from the actuating stem in at least the upward direction, that is, when the fixed abutment has been reached.

Still another object is to provide a unit which is efficiently sealed against oil leakage, to avoid the hazard of leak oil getting ignited when the unit is used, for instance, in connection with valves operating under high temperatures.

Features of this invention reside in the novel and efficient construction of a rotary compensating device or thrust responsive or thrust absorbing assembly comprising a rotary thrust member designed to serve as a cage for the compensating springs.

According to one feature the rotatable thrust member of this compensating device comprises a tubular member having a widened portion adapted to have disposed therein the compensating springs. Both end portions of this thrust member are journaled with respect to the housing of the mechanism but fixed with respect to longitudinal movement therein. The drive nut for the stem has driving engagement with the thrust member so as to rotate therewith, but is longitudinally movable with respect thereto and against the pressure of the compensating springs.

According to another feature the rotary thrust member encloses the compensating springs as well as the driving nut for the stem, and it is designed to permit the convenient upward removal of the nut from the thrust member without necessitating the removal or the disturbance of the drive mechanism itself.

Another feature provides a rotary stem actuating or thrust member which has efficient thrust bearings to transmit upward thrust to the top and downward thrust to the bottom of the casing that houses the mechanism.

According to another feature a rotary stem actuating thrust member transmits stem thrust to the top and to the bottom respectively of the casing, and it has efficient oil sealing means below the lower thrust bearing and effective between the bottom of the casing and a downward extension of the thrust member.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 3 shows a longitudinal section of the mechanism comprising another form of the rotary compensating device according to the invention.

Fig. 5 shows the manner in which the driving nut can be removed in the mechanism of Fig. 3 without disturbance of the drive mechanism.

Figure 1:
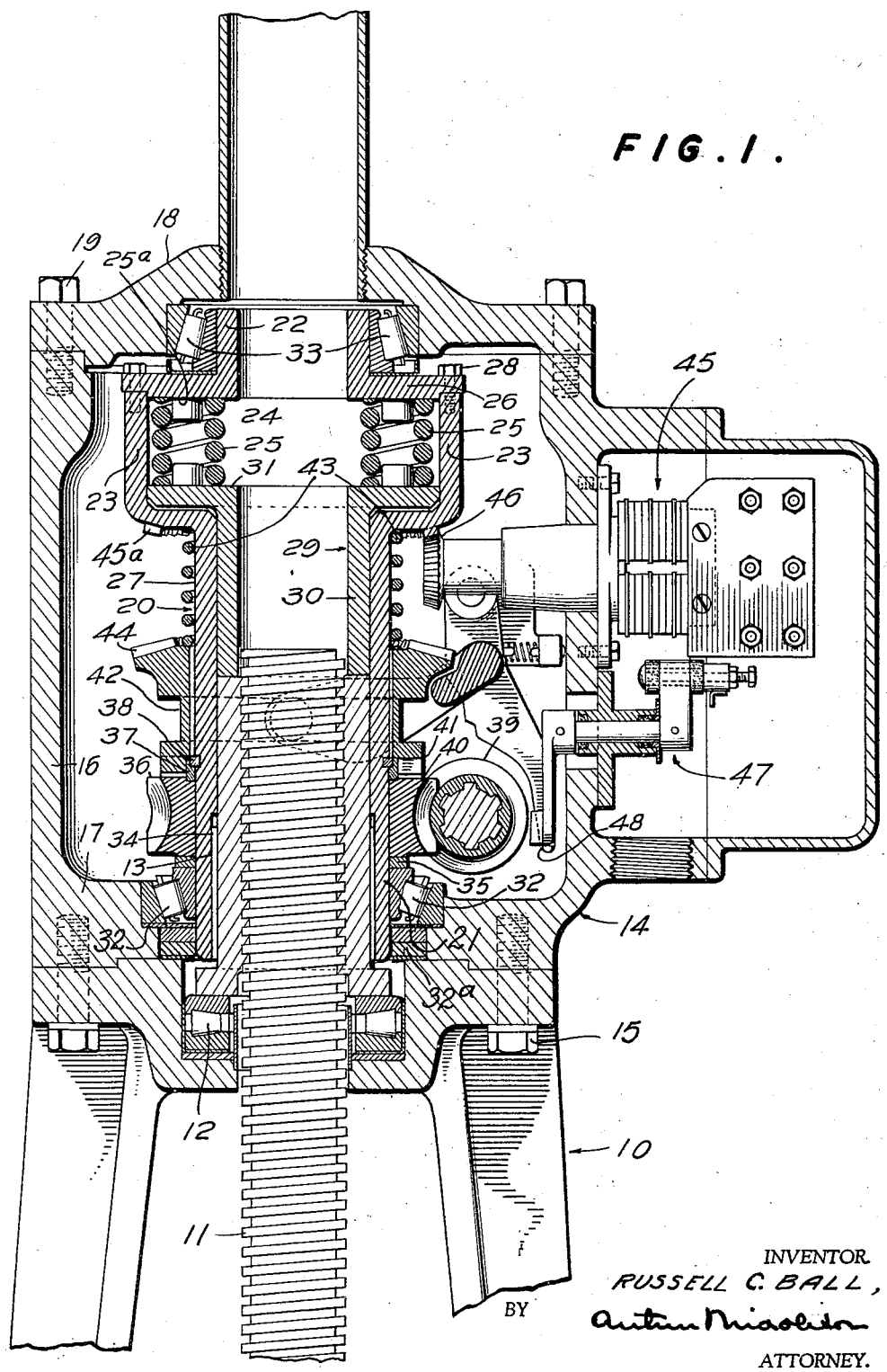
Fig. 1 shows a longitudinal section of the mechanism comprising one form of the rotary compensating device according to the invention.

According to Fig. 1 a base portion for the control mechanism comprises a yoke construction 10, which may rise from a valve housing (not shown). A valve stem or the like is designated by the numeral 11. An annular roller thrust bearing 12 is carried by the yoke construction to take up thrust from an actuating nut 13 for the stem. A housing 14 for the drive mechanism is mounted upon the yoke construction 10 by means of bolts 15. The housing comprises a main body portion 16 having an inward flange portion 17 at the bottom, and it further comprises a top cover portion 18 fastened by screws 19 to the main body portion.

Within the housing is mounted drive mechanism for the actuating nut 13, and it comprises a rotary compensating assembly for absorbing excess axial pressure from the stem 11. The compensating assembly is represented by a tubular thrust member 20 having end portions 21 and 22 journaled in respective ends of the housing, and having intermediate its ends a widened portion 23 representing a chamber or cage 24 for a set of compensating springs 25 adapted to absorb the excess pressure.

The chamber or cage 24 is accessible inasmuch as the thrust member has at the top a detachable end portion 26 normally fastened to the body portion 27 of the thrust member by means of screws 28. Within the thrust member is an annular thrust transmitting element 29 consisting of a cylindrical portion 30 endwise engaging with the actuating nut 13, and of a flange portion 31 designed for pressure engagement with the compensating springs 25. The lower end portion of the thrust member 20 is journaled in a conical roller bearing 32 mounted in the bottom flange portion 17 of the housing. Underneath the lower bearing 32 there is a seal 32a of suitable packing material effective between the portion 21 of the thrust member 20 and the bottom flange 17 of the housing. The upper end portion of the thrust member 20 is journaled in a conical roller bearing 33 mounted in the top cover portion 18 of the housing.

It will be noted that the thrust member 20 is rotatable in the housing 14, but longitudinally substantially immovable, whereas the actuating nut is in telescoping slidable or longitudinally movable engagement with the thrust member 20 by virtue of key and groove engagement 34.

The tubular thrust member 20 is rotated by means of driving mechanism disposed substantially between the lower and the upper journal bearings 32 and 33 respectively. Next to the lower bearing 32 and spaced therefrom by a ring 35 is a worm gear 36 loose upon the thrust member 20 but secured against axial displacement by a ring 37 which in turn is held in place by a split ring 38 placed into a groove on the thrust member 20.

The worm gear 36 is driven by a worm 39 which may be driven from a motor attached to the housing 14 but not shown. The worm gear 36 has crown teeth 40 adapted to engage upon corresponding crown teeth 41 of a clutch member 42 which is slidable into and out of engagement with the worm gear 36, and has key connection with the thrust member 20 in order to be driven thereby. A coil spring 43 tends to keep the clutch member 42 in operative interengagement with the worm gear 36.

The clutch member 42 has rigid therewith a bevel gear 44 adapted for optional engagement with hand operated gearing (not shown) for rotating the thrust member 20. Accordingly, clutch operating means are indicated at 44a, whereby the clutch member 44 may be shifted into and out of driving engagement with the worm gear 36.

At 45 is indicated a limit switch mechanism which may be of some known type, and which functions to cut the motor power at a point corresponding to an upper limit position of the stem 11. This limit switch mechanism is driven by way of bevel gear teeth 45a provided on the thrust member 20 and meshing with a bevel gear 46. Another switch device 47 is to cut the motor power when the stem 11 is in lowermost position, and it is designed to function in response to a certain amount of excess pressure imparted to the stem by the drive mechanism when the stem has reached its lower terminal position as defined by a fixed abutment such as the valve seat. This responsiveness to excess pressure is due to axial displacement of the worm 39, which axial displacement actuates the switch device 47 by way of an arm 48 thereof, substantially in the manner described in the patent to Ball, No. 2,114,013.

Figure 2:
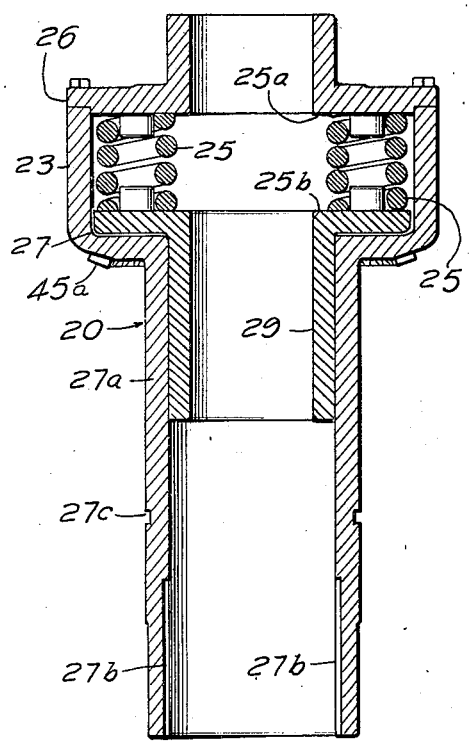
Fig. 2 shows a detail of the rotary thrust member from Fig. 1.

In Fig. 2 there is shown in detail that part of the compensating device or assembly which comprises the thrust member 20 having the two component portions, namely, the detachable end portion 26 and the body portion 27. The body portion 27 consists of a cylindrical lower portion 27a having internal key grooves 27b and an external groove 27c designed for the reception of the split ring 38, and of the widened cup-shaped portion 23, the lower side of the bottom of which is formed with the bevel gear teeth 45. This assembly further includes the annular thrust transmitting element 29, and the compensating springs 25 confined between the opposed annular faces 25a and 25b presented by the detachable end portion 26 and the thrust transmitting element 29 respectively.

The construction in Fig. 3 differs from that in Fig. 1 by way of some modifications in the structural relation between the rotary compensating device and the actuating nut for the stem.

In this instance the housing of the mechanism is designated by numeral 49, the top cover portion thereof by numeral 50, and a stem by numeral 50a. The rotary compensating device comprises a rotary driven thrust member 51 journaled in a lower conical roller bearing 52 and an upper similar bearing 53. Again the thrust member consists of a lower body portion 54 and a detachable top end portion 55, both together forming a widened portion 56 serving as a chamber or cage 57 for the reception of compensating springs 58, and a thrust transmitting annulus.

It should be noted that in this instance an actuating nut 59 for the stem 50a is entirely contained within the rotary thrust member 51. At its upper end the nut 59 is formed with a flange portion 60 normally resting upon a shoulder 61 at the bottom of the chamber or cage 57. The nut 59 is slidable within the rotary thrust member 51 although connected for driving connection therewith by means of key and groove connection 62. A thrust transmitting annulus 63 is interposed between the nut 59 and the compensating springs 58.

It will be noted that the actuating nut 59 can be conveniently removed for inspection or removal as the like (as illustrated in Fig. 5) without removing the elements of the drive mechanism. In order to get at the nut 59, one needs but to remove the top cover portion 50, and thereafter the top end portion 55 of the rotary thrust member 51 and the springs 58 and annulus 63, whereupon the nut 59 can be screwed off the stem 50a in an upward direction by rotating the body portion 54 of the thrust member 51.

Figure 4:
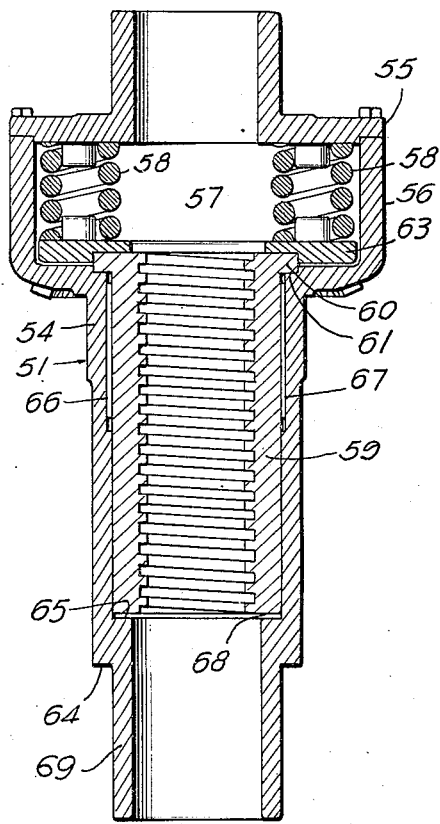
Fig. 4 is a detail of the rotary thrust member from Fig. 3, showing the driving nut enclosed therein.

Fig. 4 is a detail taken from Fig. 3 to show the rotary compensating device or thrust responsive assembly with the nut 59 enclosed in the rotary thrust member 51. In this embodiment the lower end portion of the thrust member 51 is reduced, as indicated by the outer shoulder 64 and by a corresponding inner shoulder 65, which latter confines the lower end portion of the nut 59, although with a suitable clearance indicated at 68, a pair of torque transmitting key and groove connections between the nut 59 and the rotary thrust member 51 are shown at 66 and 67.

With respect to Fig. 3, it is to be noted that the thrust member 51 has a free lower end portion 69 extending below the lower conical thrust bearing 52. Due to the nut 59 being located upwardly of the lower thrust bearing 52, the diameter of the free lower end portion 69 may be made as small as feasible and it may approach that of the stem 50a. A packing 70 is provided between the lower free end portion 69 and the bottom portion 71 of the housing 49.

In Fig. 3 it will further be noted that the nut member 59 is so disposed within the thrust member 54 that it will transmit the thrust from the stem in both directions through the thrust member to the top and to the bottom respectively of the housing 49. That is to say, upward thrust from the stem is transmitted through the thrust member and the upper bearing 53 to the top of the housing, while downward thrust from the stem is transmitted from the thrust member through the lower bearing 52 to the bottom 71 of the housing, by way of the flange portion 60 of the nut member 59.

Referring to Fig. 1 the operation of the device representing a valve actuating mechanism, is as follows:

In order to raise the stem to open the valve, the power driven worm 39 is rotated in the corresponding direction to drive the worm gear 36 which by way of the clutch teeth 40 and 41 drives the clutch member 42 and thereby the thrust member 20. This rotates the actuating nut 13 raising the stem 11 while imposing upon the nut 13 a downward thrust reaction due to whatever resistance may be present, which thrust reaction is taken up by the annular thrust bearing 12. A predetermined extreme upward position is assumed by the stem due to the action of the limit switch 45 which is geared to the thrust member 20. During this upward movement of the stem the conical roller bearings 32 and 33 of the thrust member 20 are free from any substantial thrust although they are capable of absorbing upward and downward thrust respectively.

The downward movement of the spindle, of course, is effected by reversing the rotation of the worm drive 39, 36, imposing upon the actuating nut 13 an upward thrust reaction when the valve is seated. An excess upward thrust is absorbed through the thrust transmitting element 29 by the springs 25, and the resultant net pressure is taken up by the upper bearing 33 of the thrust member 20 and consequently absorbed by the cover 18 and the housing 16. Also after the valve is closed, thermal expansion of the spindle 11 will not unduly affect the valve seating pressure because of the compensating effect of the springs 25.

As the spindle descends and the valve is being closed, the axially displaceable worm shaft 39 yields against spring pressure, thus absorbing excess torque resistance until the switch 47 functions as a result of such shaft displacement, to cut the motor power substantially in the manner described in the patent to Ball, No. 2,114,013. This insures a valve seating pressure which is not in excess of a desirable value.

In Fig. 3, because of the different arrangement of the actuating nut 59, upward and downward thrust are absorbed by the bearings 53 and 52 respectively of the thrust member 51, thus doing away with a separate thrust bearing for the actuating nut, such as shown in Fig. 1.

A further advantage of the particular location of the nut 59 is that it makes possible the provision of the reduced lower free end portion 69 as part of the thrust member 51, to extend downwardly to a level below the lower bearing 52, to permit the provision of the packing 70 which seals the portion 69 against the bottom portion 71 of the housing 49. This packing between a stationary and a purely rotary element effectively prevents the escape of any oil from the mechanism down the stem, and thereby avoids the ignition of any leak oil under high temperature operating conditions, such as with high pressure steam valves.

Still another advantage of a more mechanical nature inherent to this arrangement of the nut 59, lies in the possibility of conveniently removing the nut 59 upwardly substantially without disturbing the mounting of the drive elements or switches, in the manner illustrated in Fig. 1.

I claim:

1. In a power driven control apparatus, such as a power controlled valve construction, having a threaded actuating stem operable between limits of longitudinal movement, one of which limits is fixed, and having a base construction in which operates said stem, mechanism for raising and lowering said stem comprising a rotatable nut member upon said stem, the rotation of which nut member raises and lowers said stem, a rotatable thrust member surrounding the stem and having driving engagement with said nut member to rotate therewith, said thrust member being rotatably mounted with respect to said base portion and longitudinally immovable with respect thereto, said thrust member being formed with a widened portion to provide opposedly disposed interior annular faces extending substantially transversely of a longitudinal axis of the thrust member, spring means disposed within said widened portion of the thrust member and intermediate said annular faces thereof, said nut member being longitudinally movable with respect to the thrust member against the pressure of said spring means, and drive mechanism supported by said base portion for rotating said thrust member.

2. A control apparatus according to claim 1, in which the base construction comprises a housing for the mechanism, said thrust member having end portions journaled in said housing.

3. A control apparatus according to claim 1, in which the base construction comprises a housing for the mechanism, and in which the thrust member has end portions journaled in the housing, said nut member having telescoping engagement with said thrust member, and being adapted to remain in place on the stem, when the thrust member is removed.

4. A control apparatus according to claim 1, in which the base construction comprises a housing for the mechanism, said housing having a detachable top portion, the removal of which is adapted to expose the top portion of said rotatable thrust member, said rotatable thrust member having end portions journaled in the housing, with the addition that the thrust member has a lower body portion and a detachable top portion, and that said nut member is removable upwardly after said top portion is removed while said body portion and drive mechanism associated therewith remain in place.

5. A control apparatus according to claim 1, in which the base construction comprises a housing for the mechanism, in which furthermore the nut is disposed with respect to the thrust member so as to transmit thereto the thrust from the stem in both directions, and in which a combination thrust and journal bearing at the top transmits upward thrust to the top portion of the housing, and a similar bearing transmits downward thrust to the bottom portion of the housing.

6. A control apparatus according to claim 1, in which the base construction comprises a housing for the mechanism, in which the nut member is disposed with respect to the thrust member so that stem thrust in both directions is transmitted through the thrust member, in which furthermore the top of the housing absorbs upward thrust reaction and the bottom of the housing absorbs downward thrust reaction from the thrust member, and in which the thrust member has a free lower end portion, with the addition of packing means effective between said free lower end portion and the bottom of said housing.

7. In a power driven control apparatus, such as a power controlled valve construction, having a threaded actuating stem operable between limits of longitudinal movement, one of which limits is fixed, and having a base construction in which operates said stem, which base construction comprises a housing for stem actuating mechanism such as hereinafter defined, actuating mechanism for raising and lowering said stem comprising a rotatable nut member upon said stem, the rotation of which nut member raises and lowers said stem, a rotatable thrust member surrounding the stem and having driving engagement with said nut member to rotate therewith, said thrust member being rotatably mounted with respect to said base portion and longitudinally substantially immovable with respect thereto, said nut member being longitudinally movable with respect to said thrust member and also being disposed with respect to the thrust member so that stem thrust in at least the upward directions is transmitted through the thrust member, resilient means effective between said thrust member and said nut member, to absorb upward stem thrust from the nut member to the thrust member, upper bearing means for the thrust member to transmit upward thrust therefrom to the upper portion of the housing.

8. Actuating mechanism according to claim 7, in which said thrust member has a lower free end portion extending below said lower bearing, and packing means effective between said free lower end portion and the bottom of said housing.

9. In a power driven control apparatus, such as a power controlled valve construction, having an actuating stem and a nut member to drive the same, a thrust responsive assembly comprising a tubular rotatable thrust member adapted to surround said stem for cooperation with said nut member to absorb excess axial pressure from the stem, said thrust member having a widened portion having opposedly disposed interior annular faces extending substantially transversely of the longitudinal axis of the thrust member, said thrust member being adapted to be journaled with respect to the housing, spring means disposed within said widened portion and intermediate said annular faces therein, and adapted to absorb said excess axial pressure reaction from the stem, said thrust member comprising a removable end portion to permit exposing the interior of the widened portion and the spring means.

10. A thrust member according to claim 9, with the addition of a thrust transmitting annular element disposed and longitudinally movable within said thrust member and effective between said nut member and said spring means to transmit pressure from said nut member and to be absorbed by said spring means.

11. A thrust absorbing assembly according to claim 9, with the addition of a thrust transmitting annular element disposed and longitudinally movable within said thrust member and effective between said nut member and said spring means to transmit pressure from said nut member to be absorbed by said spring means, said annular element comprising a cylindrical portion, one end of which is associated with said nut member to transmit pressure therefrom, the other end of which is formed with a flange portion adapted to transmit the pressure to said spring means.

12. A thrust absorbing assembly according to claim 9, with the addition that said thrust member encloses both ends of said nut member, and permits the removal of the nut member after the detachable end portion of the thrust member has been removed.

RUSSELL C. BALL.